United States Patent [19]
Stickler et al.

[11] Patent Number: 5,349,811
[45] Date of Patent: Sep. 27, 1994

[54] PULSED FUEL INJECTION SYSTEM FOR REDUCING $NO_x$ EMISSIONS

[75] Inventors: David B. Stickler, Carlisle; Daniel W. Swallom, Reading; Judith E. Reich, Andover; Victor M. Goldfarb, Swampscott; Isaac Sadovnik, Newton, all of Mass.

[73] Assignee: Avco Corporation, Providence, R.I.

[21] Appl. No.: 991,185

[22] Filed: Dec. 16, 1992

[51] Int. Cl.⁵ ............................................. F02C 9/26
[52] U.S. Cl. ........................ 60/39.06; 60/39.281; 60/734
[58] Field of Search ............... 60/39.06, 39.281, 734; 431/1

[56] References Cited

U.S. PATENT DOCUMENTS

| | | | |
|---|---|---|---|
| 3,006,144 | 10/1961 | Arnett et al. | 60/39.281 |
| 3,688,495 | 9/1972 | Fehler et al. | 60/39.281 |
| 3,798,901 | 3/1974 | Lewenhaupt | 60/39.27 |
| 3,946,551 | 3/1976 | Linebrink et al. | 60/39.281 |
| 4,015,426 | 4/1977 | Hobo et al. | 60/39.281 |
| 4,454,713 | 6/1984 | Meyer et al. | 60/39.281 |

*Primary Examiner*—Louis J. Casaregola
*Attorney, Agent, or Firm*—Perman & Green

[57] ABSTRACT

A system for reducing the formation of $NO_x$ pollutants during the combustion of liquid fuel in a gas turbine engine. The system comprises introducing an externally modulated, rapidly-pulsed, oscillated or sinusoidal fuel flow delivery rate (generically referred to as "modulated") to produce a controlled degree of combustor air input flow oscillation and bulk flow oscillation within the combustor which enhances the fuel-air mixing rate and homogeneity within the combustor, decreases the residence time of transition fuel/air mixtures prone to $NO_x$ formation, and substantially decreases the $NO_x$ concentration in the resulting combustion gas product without creating a net pressure gain throughout the combustion chamber.

40 Claims, 5 Drawing Sheets

PULSED FUEL INJECTION SYSTEM FOR REDUCING NO$_x$ EMISSIONS

BACKGROUND OF THE INVENTION

Continuous combustion engines such as gas turbines are powered by the continuous combustion of fuel/air mixtures in predetermined relative proportions, accompanied by the continuous delivery of the products of the combustion, including highly objectionable nitrogen oxide gases, primarily NO and NO$_2$, generally referred to collectively as NO$_x$, The extent of formation of such NO$_x$ species is to a large extent controlled by the chemical kinetic rate of their formation during the combustion process and the time scale of critical steps in the combustion process. The kinetic rate is dependent upon the fuel-to-air ratio, which generally varies in different areas of the combustion chamber, and the temperature in said areas. The combustion process time scales are dependent upon fuel and air input and mixing conditions.

The liquid fuel is introduced through nozzles or fuel injectors in the form of a fine spray. The air is compressed and introduced to the combustion chamber through a multiplicity of discrete jets and cooling passages. A minor amount of the air passes through the fuel nozzle to assist spray formation and distribution. A further amount of the air is introduced to mix with this spray as primary air to form an initial combustible mixture with the fuel. The bulk of the air supply flows into the combustion chamber further downstream, in part as cooling flow for the combustor walls, and in part as directed jets forcing mixing of the flow in the combustor. It completes combustion of the gases from the primary combustion zone, and dilutes and cools them.

In the case of gas turbine engines, the temperature of the combustion air is very high and this favors the rapid formation of NO$_x$ gas species. Such pollutants result in unhealthy air conditions at ground level in the area of airports and contribute to ozone depletion at higher altitudes.

The overall problem is to limit or minimize nitrogen oxide production and attendant emissions from combustors, particularly gas turbines, having combustion systems firing clean liquid fuels (e.g. kerosene, JP-4, Jet-A) with air. In gas turbines, the primary fuels are Jet-A and JP-4, with air typically compressed to a pressure ratio in the range 6 to 50. At sea level, this results in air input to the combustor at 500°–1200° F., and operating pressure in the range 6 to 50 atmospheres. The global combustion process typically includes substantial excess air.

Under these conditions, fixation of air nitrogen, primarily as nitrogen oxide (NO) and nitrogen dioxide (NO$_2$), is thermodynamically driven. Chemical equilibrium NO$_x$ (NO+NO$_2$) concentration is dependent on initial air temperature and combustion stoichiometry. The actual quantity of NO$_x$ is typically less than this equilibrium value, controlled by the rate of its formation during the combustion process.

Figure 1:
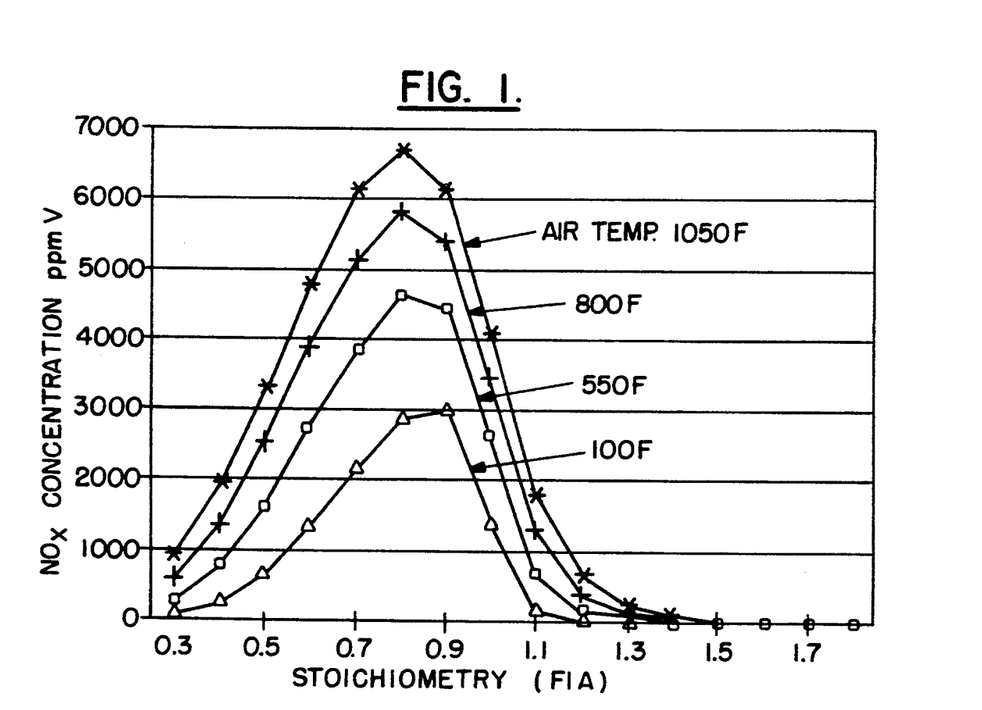
FIG. 1 is a graph illustrating the effects of initial air temperature and fuel air ratio on the chemical equilibrium level of $NO_x$ gases in combustion products.

Typically, a gas turbine combustor exit stoichiometry is in the range 0.3 to 0.5 (F/A), with corresponding equilibrium NO$_x$ in the range 40 to 3500 ppm—see FIG. 1 of the accompanying drawings.

This is not acceptable in terms of atmospheric pollution. Stationary power systems and low altitude aircraft applications result in concentrated NO$_x$ emission, typically near urban areas. Current-generation commercial aircraft, cruising in the upper troposphere, add NO$_x$ in the 25,000–40,000 foot altitude range. Higher flight altitude, attractive for supersonic cruise, will result in NO$_x$ dispersal in the stratosphere, resulting directly in destruction of atmospheric ozone (O$_3$) by selective reaction with NO$_x$.

NO$_x$ formation is based on complex free radical gas phase chemistry. In the course of combustion of hydrocarbons with air via a spray diffusion flame subject to dilution with excess air, the reacting mixture composition and temperature inevitably transitions through a regime of very high NO$_x$ formation rate. This problem is exacerbated by the high combustion air temperature associated with gas turbine operation.

Figure 2:
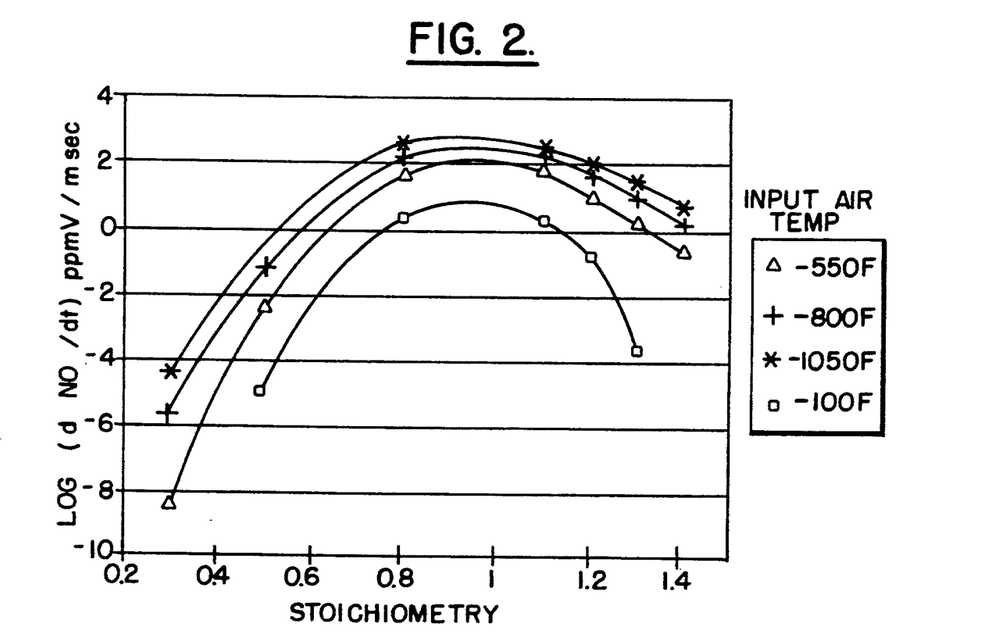
FIG. 2 is a graph illustrating the rate of formation of $NO_x$ gases at different initial air temperatures for different fuel/air ratios.

This rate varies with input air temperature and local combustion gas stoichiometry, and can be expressed in ppm/millisecond—see FIG. 2 of the accompanying drawings. Relative to a total residence time of typically 5 msec, peak formation rates of a few ppm/millisecond are acceptable. However, realistic values of gas turbine combustor input air temperature result in peak formation rates in the range 100 to 1000 ppm/msec. Following the sequence of fuel oxidation from high to low stoichiometry, the absolute equilibrium NOx level is low for stoichiometry greater than about 1.4, even though the formation rate approaching this level can be high. Transitioning to lean conditions, at stoichiometries in the range 0.5 to 0.6 the formation rate becomes low enough that even though the equilibrium level can be high, it is not achieved in the available combustor residence time. Consequently, the critical regime for NO$_x$ formation is in the F/A composition transition from about 1.2 to 0.6.

DISCUSSION OF THE PRIOR ART

Two approaches for minimizing NO$_x$ formation are well known. The first employs sequential fuel-air mixing and reaction. Liquid hydrocarbon fuel is first combusted with limited air to give highly under-oxidized products, with the fuel elemental species (C and H) represented by CO, CO$_2$, H$_2$, and H$_2$O. Net NO$_x$ formation in this environment is minimal. Subsequently, excess air is mixed with this gas to form fuel combustion products as CO$_2$ and H$_2$O with excess O$_2$. This product is typically at a temperature for which the rate of NO$_x$ formation is very low, relative to residence time of the gas prior to cooling by turbine expansion. Transition from the under-oxidized to excess air condition is forced to occur in a very short time by choice of combustor geometry and steady flow air delivery velocity, so that the combustion gas exists for a very short time in the regime of temperature and chemical composition for which the chemical kinetic rate of NO$_x$ formation is high. Consequently, the total quantity of NO$_x$ formed is limited by the air-combustion gas mixing rate. This approach is typically referred to as Rapid Quench Lean Burn (RQLB) combustion. It imposes engineering constraints on combustor design and on system operating conditions. In particular, the requirement for very rapid dilution air mixing typically results in a combustor geometry with a narrow flow passage in the quench/dilution regions, with attendant flow pressure loss. Also, high dilution air jet velocity imposes an additional pressure loss on the overall flow from gas turbine compressor to turbine. This directly decreases overall engine efficiency. Also, the enhanced local flow velocity directly increases heat transfer to the combustor structure, increasing cooling airflow demand. Finally, excessively rapid mix and quench to low temperature can result in incomplete oxidation of CO to $CO_2$, with a corresponding increase in exit CO emission. Consequently, while this approach to $NO_x$ emission control can result in decreased net $NO_x$ emission, the cost to system efficiency and thermal lifetime can be very steep, restricting its applicability to moderate levels of $NO_x$ control.

An alternative means of avoiding high $NO_x$ formation rate condition employs spray combustion, as outlined for RQLB, but with water spray injection included in or upstream of the combustor to decrease the peak temperature, and correspondingly both equilibrium $NO_x$ concentration and rate of $NO_x$ formation (shown in FIGS. 1 and 2). It is roughly equivalent chemically to RQLB with lower input air temperature. This is effective in current commercial distillate fueled stationary turbines, but is expensive in terms of capital equipment for ensuring adequately clean water delivery, and in system efficiency loss due to water vaporization, It is not attractive for aircraft applications.

The second general approach to $NO_x$ emission control is based on total avoidance of the thermochemical regime of high $NO_x$ formation rate. This can be achieved by prevaporizing the liquid fuel and mixing it with substantial excess air prior to combustion. Two limitations affect this approach. First, achievement of prevaporization and mixing is difficult in terms of fuel cracking and coking, and interms of auto-ignition. Local regions of near-stoichiometric air-fuel vapor necessarily exist, and can potentially ignite. Once such ignition occurs, $NO_x$ control is lost, and thermo-mechanical hardware failure is probable. Second, combustion of the dilute fuel-air mixture is relatively slow, and can require a catalytic combustor system. Operating and durability constraints imposed by the catalyst and its physical support structure severely limit application of this technique in gas turbine systems.

Many systems have been developed for sensing the internal or emission conditions of an internal combustion engine and automatically controlling the supply of fuel and/or air to improve engine performance, overcome unstable conditions, provide engine acceleration, throttle response, etc.

Reference is made to U.S. Pat. No. 3,218,803 for its disclosure of a system including a valve means for airflow control to a combustor in order to increase gas pressures prior to allowing gas expansion through the turbine stages. A hydraulic process controls fuel flow in response to engine operating conditions. There is no suggestion that such system enhances fuel air mixing or reduces $NO_x$ emissions.

It is known to supply liquid fuel, such as oil, to a burner in the form of timed pulses of fuel in order to regulate the fuel supply and avoid the necessity for on/off fuel burner operation. Reference is made to U.S. Pat. No. 4,276,857 for its disclosure of an ultrasonic nozzle operated by pulsed signals from a control system.

Reference is made to U.S. Pat. Nos. 3,002,349, 3,306,037, 3,327,472 and 3,357,177 for their disclosures of fuel delivery control systems for rapid engine throttle response. There is no suggestion of enhanced fuel/air mixing or reduced $NO_x$ emissions.

Reference is made to U.S. Pat. No. 4,752,209 for its disclosure of pulse combustion burners for mixtures of air and fuel gas, comprising flapper valve means for controlling air and/or gas flow in response to oscillating burner pressures within a self-resonant combustor.

Finally, reference is made to U.S. Pat. Nos. 2,530,019, 3,053,047, 3,688,495, 4,454,713 and 4,910,956 for their disclosures of other fuel metering systems for gas turbine engines. Such systems do not relate to improving fuel/air mixing to reduce $NO_x$ emissions.

SUMMARY OF THE INVENTION

The present invention relates to an improved system for providing high efficiency combustion of fuel/air mixtures in a gas turbine engine while decreasing the rate of $NO_x$ formation, and is characterized by the introduction of an externally modulated, rapidly pulsed, oscillated or sinusoidal fuel flow delivery rate (hereinafter referred to generically as "modulated") to the combustor under predetermined conditions which produce enhanced fuel/air homogeneity throughout the combustion chamber, without creating a net pressure gain through the combustor, and related advantages which substantially reduce conditions favorable to the formation of $NO_x$ pollutants and thereby substantially decrease $NO_x$ concentration in the combustion gas.

Thus, the invention comprises supplying fuel continuously to a combustion chamber as a steady flow rate to which externally modulated increases in fuel flow are added, e.g., by cyclic fuel feed pressure variation, in the pulsation frequency range of 10 to 1000 Hz (cycles per second), to produce a transient increase in the fuel supply rate of at least about 10% in excess of the normal continuous rate fuel supply. Alternatively, the fuel delivery rate to the combustor can be modulated to provide for a temporal variation of at least 10% relative to the time averaged steady flow rate. The supply of the fuel and primary air to the combustion chamber, via a fuel injector/atomizer nozzle, produces a controlled variation of primary zone combustion temperature and volume, resulting in a controlled degree of gas flow oscillation within the combustor which. can be excited and driven to finite absolute amplitude using a relatively minor amplitude of fuel flow pulsation modulation, to produce a net bulk flow oscillation within the combustor volume at negligible net loss in system pressure. The effect is that the cyclic expansion and contraction of the combustion zone, triggered by the fuel flow modulation and enhanced by a resulting combination of oscillating air input flow rate and internal combustor resonance, substantially improves the gas phase mixing rate and homogeneity and substantially decreases the formation of $NO_x$ gases. In general a fuel flow modulation of up to about 30% of the time averaged flow is possible if the flow is modulated sinusoidally, and up to about 50% if the flow is modulated as pulsed increases or decreases.

The amplitude of the fuel flow modulation can be correlated to the amplitude of the combustion pressure oscillation, or to the combustor-plenum pressure differential oscillation, or to the magnitude of light emission oscillation, or to the degree of $NO_x$ control. Such correlation can be measured by appropriate sensors to provide a feedback control for regulating the degree or amplitude of the fuel flow and the frequency of the fuel pulsation to produce the desired result, ultimately the desired low level of $NO_x$ emission at the lowest possible fuel pulsation amplitude.

The primary effect of such mixing is rapid mixing of regions of hot combustion gases with cooler, typically higher oxygen content gases, with the result that combustion gases exist for only a very short time under high temperature conditions with high formation rate of $NO_x$. In the course of this mixing and combustion process, partially oxidized combustion gases such as carbon monoxide (CO), hydrogen ($H_2$), and various hydrocarbon gases also complete their oxidation to form carbon dioxide ($CO_2$) and water vapor ($H_2O$). Excessively rapid mixing can not only decrease the extent of $NO_x$ formation, but may also result in incomplete oxidation of CO, $H_2$, and hydrocarbons. It is therefore desirable to provide for a mixing rate sufficient to constrain the extent of $NO_x$ formation, while allowing complete oxidation of the combustion gases.

DETAILED DESCRIPTION OF THE INVENTION

The present invention is concerned with an improved fuel delivery system for steady flow combustion devices, particularly gas turbine engines, for reducing the emission of $NO_x$ gases below the objectionable amounts currently produced by conventional gas turbine combustion engines.

As illustrated by FIGS. 1 and 2 of the drawings, the equilibrium concentration and rate of formation of objectionable $NO_x$ gases during the combustion of jet fuel/air mixtures are highly dependent on the stoichiometry of the fuel/air mixtures and the temperature of the combustion air. In gas turbine engines the temperature of the combustion air is high and the stoichiometry of the fuel/air mixtures in certain areas of the combustor transitions through relative ratios of fuel to air which produce excessive $NO_x$ formation rates, due to the mixing transition of the fuel and the air from excess fuel to excess air conditions.

Figure 3:
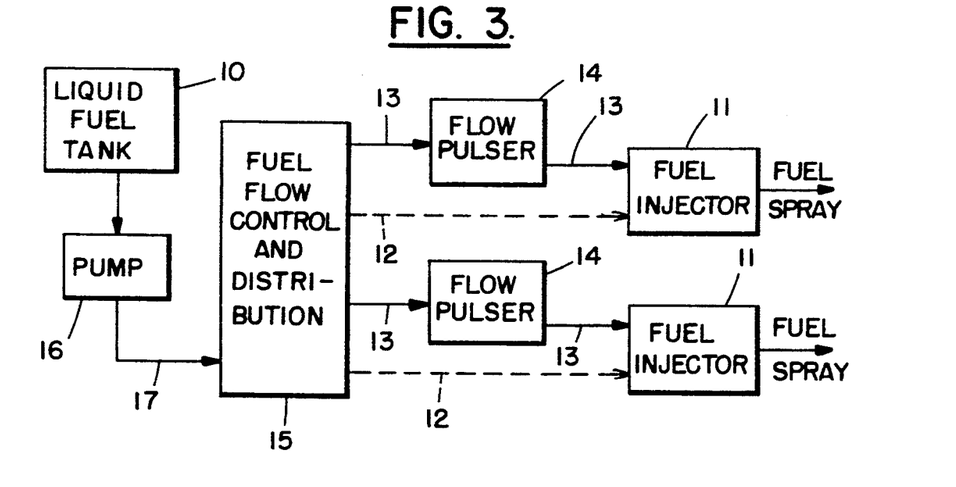
FIG. 3 is a flow diagram illustrating a gas turbine fuel delivery system according to an embodiment of the present invention.

FIG. 3 of the drawings illustrates a typical fuel delivery system comprising one or more atomizer nozzle(s) or fuel injectors 11 for delivering a pulse modulated fuel supply to a gas turbine engine according to one embodiment of the invention. This system comprises a jet fuel tank 10 providing a liquid fuel source to a pressurizing pump system 16. The pump delivers a flow through a conduit 17 to a flow control and distribution device 15, which delivers fuel typically to a multiplicity of fuel injectors 11, each of which provides a fuel spray to a portion of the jet engine combustor, or to one of a multiplicity of discrete combustor cans comprising the total combustor. A steady flow fuel portion may be provided to each fuel injector 11 through a conduit 12. Another portion, or the entire fuel flow to the individual fuel injector 11, is provided through conduit(s) 13 which incorporate(s) a flow pulsing means 14 for periodically introducing a flow rate transient, typically corresponding to a flow pressure variation, into the fuel supplied through conduit(s) 13 to the fuel injector(s) 11. Such fuel flow modulations may occur simultaneously in all flow conduits 13, or may be time phased to one another in some preferred sequence to the various combustor fuel injectors 11. Thus, the system feeds a continuous supply of liquid fuel to each nozzle for spraying into the combustion chamber while the pressure and volume flow rate of the fuel supply is intermittently increased by the pressure pulsing means. The result is a fuel pressure and resulting flow rate transient which is periodically introduced to the combustion chamber, with the fuel pulse duration and inter-pulse delay, or fuel flow oscillation cycle period, being selected to create an optimal fuel-air homogeneity on a time scale that is short relative to that for ignition and heat transfer within the initial fuel spray volume.

The pressure pulsing means 14 may be any conventional means for introducing precisely timed pressure and corresponding flow rate modulations to the fuel supplied by conduit 13 to the atomizer nozzle 11, such as a spark discharge chamber functioning as an electrohydraulic pump, a mechanical piston displacement means, rotational flow modulating means, inert gas bubbler means, or any other conventional variable displacement means capable of timed cyclic operation to cause the supply of fuel to the nozzle 11 to occur in the form of timed pulses, superposed on a steady fuel flow, or a valve device capable of modulating the fuel flow rate to an oscillatory or sinusoidal flow. For example, in tests conducted on a JT-8B combustor operating at an air-inlet temperature associated with take-off conditions, the use of a flow modulating means 14 comprising a cylinder having a trigger hole and rotating to generate a frequency of 55 Hz for the modulation of the fuel flow transients, reduced the level of $NO_x$ in the combustor emissions by approximately 40%.

Figure 4A:
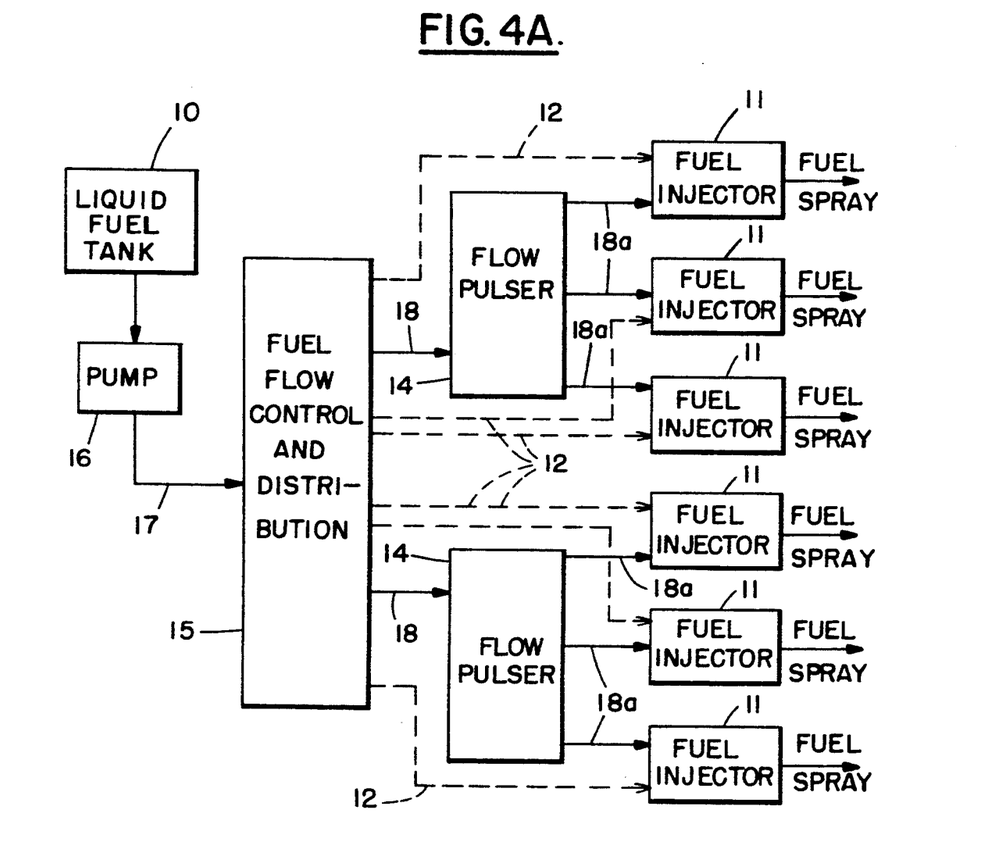
FIGS. 4a and 4b are flow diagrams illustrating gas turbine fuel delivery systems according to other embodiments of the present invention.

FIGS. 4a of the drawings illustrates an alternate fuel delivery system comprising a plurality of atomizer nozzles 11 for delivering a modulated fuel supply to a gas turbine engine according to another embodiment of the invention. This system comprises a jet fuel tank 10 providing a fuel source to a pressurizing pump system 16. The pump delivers a flow through a conduit 17 to a flow control and distribution device 15, which delivers flow typically through conduits 18 to a multiplicity of fuel injectors 11, each of which provides a fuel spray to a portion of the jet engine combustor, or to one of a multiplicity of discrete combustor cans comprising the total combustor. A steady flow fuel portion may be provided to each fuel injector 11 through individual conduits 12 as well, although all of the flow may be provided to each fuel injector 11 through the conduits 18. A flow pulsing means 14 is provided on each conduit 18 in the flow delivery path from flow control and distribution device 15 to a plurality of fuel injectors 11 comprising a means of providing a steady flow fuel delivery through each conduit section 18a to each fuel injector 11 as well as a further fuel flow quantity delivered cyclically to each fuel injector 11 served by the flow control and distribution unit 15. By this means the fuel delivery in each conduit 18 is maintained at a relatively steady level, while the fuel delivery in each conduit section 18a and fuel injector 11 is sequentially and cyclically modulated.

Figure 4B:
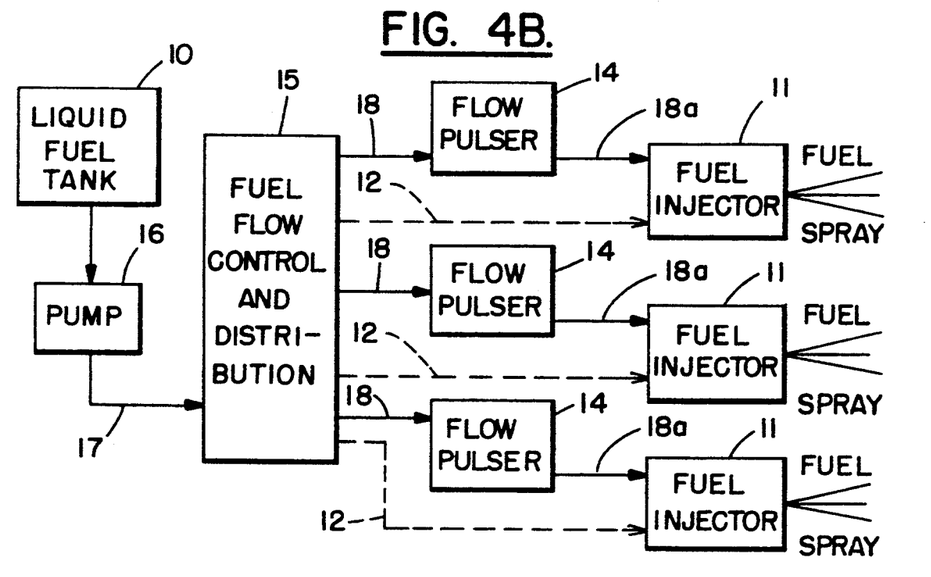

Another embodiment of the invention is shown in FIG. 4b, in which the multiplicity of fuel injectors 11 are individually served by the time-phased flow pulsing means 14. In both FIGS. 4a and 4b, the flow pulsing units may be triggered sequentially to allow time phasing of their flow modulation to each of the multiple injectors.

Figure 5:
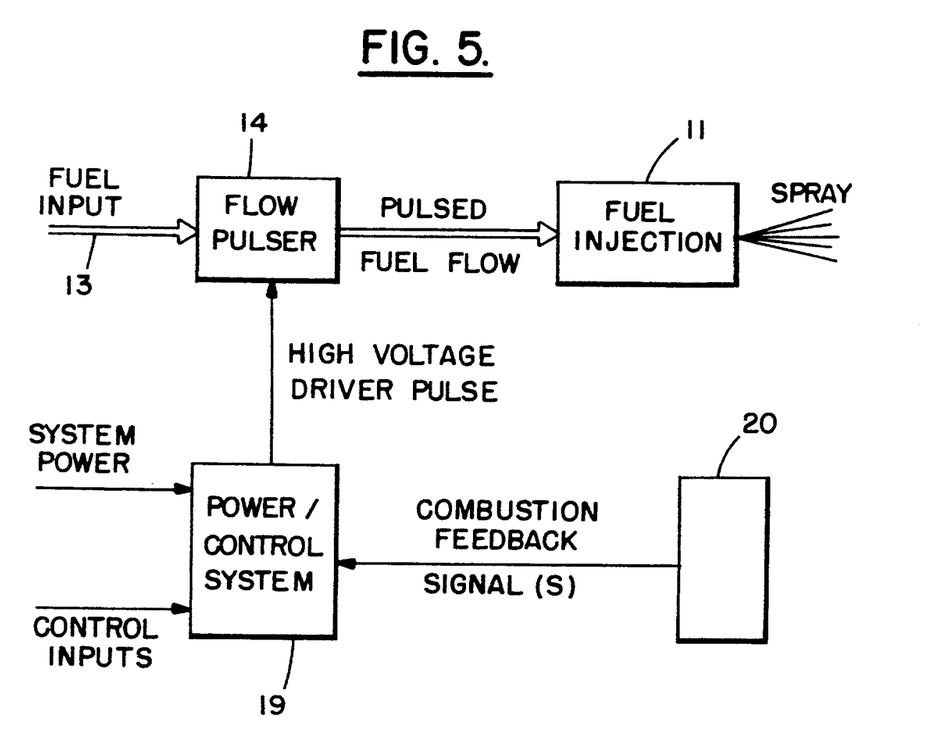
FIG. 5 is a flow diagram illustrating a fuel pulse control system according to an embodiment of the invention.

FIG. 5 of the drawings illustrates the flow pulsing means 14 of FIGS. 3, 4a and 4b in association with a power/control means 19 and a remote sensor 20 for analyzing the operation of the system, such as combustor pressure or internal flame luminosity variation, and activating the power/control means 19 to regulate and/or coordinate the fuel pulse timing, phasing, duration, amplitude and/or interpulse delay of one or more pulsing means 14 to one or more fuel injectors 11 to provide optimum fuel/air mixing effectiveness within the combustion chamber, resulting in the lowest possible $NO_x$ levels in the combustor exhaust at the minimum fuel pulsation amplitude.

The present invention can employ conventional spray combustion of distillate fuel, with staged air input for primary combustion, secondary oxidation, and dilution. Consequently, it is applicable for retrofitting existing or slightly modified gas turbine combustors. The primary innovative element is introduction of the major volume of the fuel supply in the form of a steady fuel flow plus a uniformly pulsed fuel delivery to the combustor, under conditions which drive a controlled degree of combustion flow oscillation. The overall effect is a radically enhanced mixing rate throughout the combustor, extending from fuel spray droplet interaction with combustion gas to turbulent eddy scalar property dissipation in the secondary and dilution zones. This enhanced mixing rate in turn substantially decreases the residence time available in local zones favorable to a high $NO_x$ chemical kinetic formation rate. The final benefit of this coupled fluid dynamic-combustion sequence is substantially decreased $NO_x$ concentration in the combustion gas, at minor overall cost in system efficiency.

According to the present invention, the step of forcing fuel flow rate modulation by pulsation in the pulsation frequency range 10 to 1000 Hz can result in an acoustically audible combustor response, and a well-defined change in gaseous combustion product composition. These effects show a moderate fuel pulsation frequency dependence over the cited frequency range and, under laboratory test conditions with a specific combustor and air flow, a maximum effectiveness in the frequency range of 100 to 500 Hz. This frequency range of maximum effectiveness may be expected to vary for different combustors and operating conditions.

The overall combustion mechanism responsible for the change in $NO_x$ emission is based on the response of combustion and fluid dynamics to the externally forced variation of fuel flow. The fuel flow can be defined in terms of a basic steady rate flow contribution of a major fraction of the total fuel supply, e.g., up to about 80%, with another intermittent cyclical modulated flow of the remaining fraction of the total fuel supply, which combines with the former to produce an adjustable pulsed flow rate. For example, a sinusoidally time-varying flow produces a net flow with a time averaged value equivalent to the base steady flow fraction, and a sinusoidal variation above and below that rate. Alternatively a time-varying contribution in the form of short duration cyclical pulses of increased fuel flow, as provided by the present system, adds to the steady state flow contribution to give a time-averaged flow somewhat greater than the steady state value. This condition is shown in qualitative terms in FIG. 6 of the drawings.

This time-modulated fuel flow can be introduced into the combustor volume as a spray using conventional fuel injector devices. These can include a single flow path injector using either pressure atomization or airblast atomization, or a dual flow path injector with one portion of the fuel flow delivered, typically at higher average pressure, via a pressure atomizer injection path, and a second portion of the fuel flow delivered, typically at lower average pressure, via an airblast atomizer injection path. In the latter case, either or both fuel flow portions could be driven with a time-varying contribution, although typically the pressure atomizer flow would be held steady, as the lesser flow portion, and the airblast atomizer flow portion subjected to a modulation of its flow.

This time-varying fuel flow is delivered through the fuel injector/atomizer nozzle 11 to the primary zone of the gas turbine combustor, where it disperses and mixes with the locally recirculating combustion gases and secondary input airflow. The net effect of a timed change in fuel flow rate is to change the stoichiometry in the primary zone, with a temporal averaging in mean stoichiometry roughly based on the primary zone residence time. In essence, the primary zone acts like a well-stirred reactor in partially averaging out temporal transients in input flow. This constrains the useful fuel delivery pulsation frequency to a value similar to or greater than the inverse of the primary zone residence time.

Figure 6:
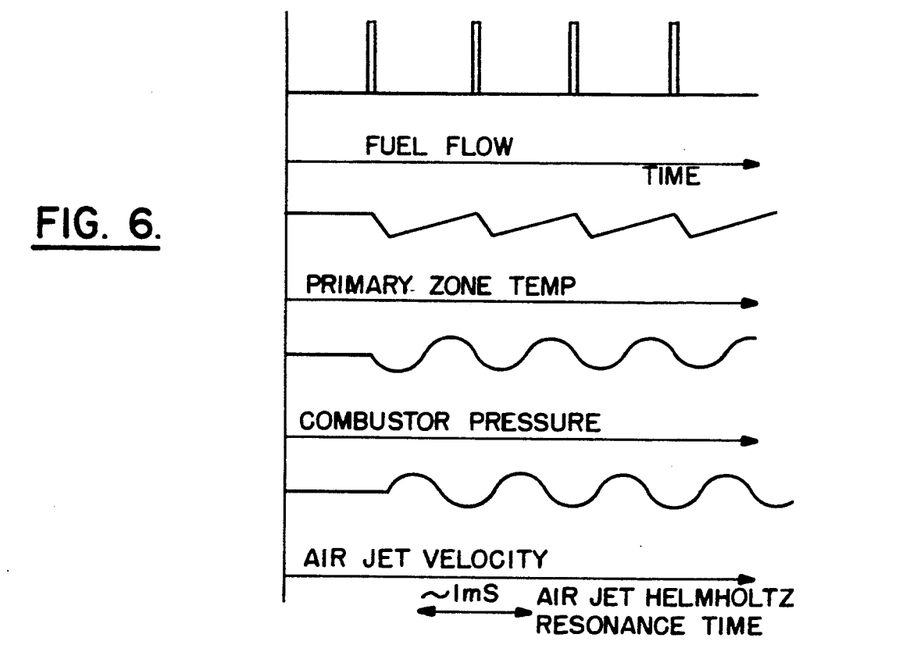
FIG. 6 is a chart illustrating the correlation between pulsed fuel flow with a transient increase in fuel supply rate, combustion zone temperature, pressure and air jet velocity for fuel pulses having a combustor-air flow resonance time of about 1 millisecond.

The net initial effect of a transient increase in fuel flow is an increase in global primary zone stoichiometry (F/A basis). This drives a sequence of thermochemical, thermodynamic, and hydrodynamic effects that lead to a substantially enhanced mixing rate, and correspondingly decreased $NO_x$ formation, in the combustor. As illustrated by FIG. 6, the direct effect of this stoichiometry increase is a change in the primary zone combustion product temperature. Since the primary zone ordinarily operates fuel-rich, a stoichiometry increase drives a corresponding gas temperature decrease, shown as "PRIMARY ZONE TEMP" in FIG. 6. For quasi-constant pressure operation, the immediate effect of this temperature drop is a corresponding increase in gas density. As this occurs on a time scale which is small relative to bulk flow times in the combustor but large relative to internal acoustic transit times, there results a decrease in primary zone gas volume, and in combustor internal pressure, shown as "COMBUSTOR PRESSURE" in FIG. 6. This pressure change is typically small in absolute magnitude, corresponding to about 1% or less of the absolute time averaged combustor pressure, and drives a weak subsidiary change in instantaneous combustor output flow. However, the small transient change in combustor pressure drives a substantial change in the secondary airflow rate into the combustor, shown as "AIR JET VELOCITY" in FIG. 6. The nominal steady state pressure drop driving the secondary airflow from the air plenum volume into the combustor is a small fraction of the combustor pressure, typically 2% to 5%. Consequently, a 1% perturbation in absolute combustor pressure may result in a 20% to 50% change in pressure drop available to drive airflow into the combustor volume. This affects all of the various airflow paths feeding the combustor volume, as well as flow within it.

Cooling airflow typically dissipates a major fraction of the available pressure drop as viscous loss in the wall structure or near-wall region. This is done intentionally to maximize its effectiveness in cooling the combustor liner. Consequently, its response to a transient in combustor pressure is dominated by its own inertia and viscous loss. Since the local volume undergoing acceleration is small, its inertial mass is small as well, and viscous loss dominates its instantaneous flow rate. It adjusts rapidly and smoothly to changes in combustor pressure. Airflow through an air-blast fuel injector, such as nozzle 11 of FIGS. 3 or 4a or 4b, also responds to the instantaneous pressure drop. It is difficult to generalize regarding the flow rate response at the nozzle 11, as atomizer internal flow geometries differ widely. However, at least a partial dynamic acceleration response of the airflow is to be anticipated, with an instantaneous inertial mass corresponding to an air column length roughly equal to the airflow path length of the injector. This is typically at least one inch, with a corresponding inertial acceleration response time in the range 0.5 to 1.0 milliseconds. The relatively large inertial mass, together with internal injector dynamic and viscous pressure loss, results in a relatively small net variation in air mass flow through the injector, in response to combustor pressure variation.

The combustor airflow which responds most aggressively to pressure variation, and couples with it in terms of overall combustion dynamics, is provided through the various wall jet flows. These typically comprise the major fraction of the air flow, and are typically distributed to provide several groups of air jet flows which penetrate directly into the combustion volume, typically into the primary zone of initial fuel spray combustion, a secondary combustion zone, and a dilution zone. They are delivered either through simple holes in the combustor liner wall, or through short ducts ("thimbles") placed typically normal to the wall as flow guides. Consequently, the air column inertial length is typically quite short, of the scale of the orifice diameter, and internal viscous damping is negligible. Dynamic response of air jet flow velocity to a change in combustor pressure is therefore both rapid and substantial. Jet flow response to a fluctuating pressure drop typically includes a finite inertial lag. In effect, the combination of jet fluid inertia and combustor volume can define an elementary form of Helmholtz resonator.

The actual air jet fluid dynamic behavior is complicated by several factors. These include the finite volume of the air supply plenum, combustor heat release and internal temperature distribution response to air flow, and the finite length of the airjet flow path. If the effective hydrodynamic jet flow path is shorter than or comparable to the mean jet velocity divided by fuel pulsation frequency, air jet flow velocity will approach an instantaneous response to the pressure differential between plenum and combustor.

Finally, it is important to recognize that fuel delivery modulation will also impact gas flow velocity distribution within the combustor. Two general mechanisms exist, and may in reality overlap. First, a longitudinal acoustic mode pressure oscillation is a well-known response to fuel flow modulation. Second, another response mode corresponds to a Helmholtz slosh mode based on the density difference between high temperature primary/secondary zone and cooler dilution zone gases. Its basic frequency is typically distinctly lower than the longitudinal acoustic mode.

These various combustor flow responses to fuel flow modulation have two points of commonality of importance to $NO_x$ emission control. First, in a purely hydrodynamic sense, they are dynamic processes with relatively minor internal dissipation. Consequently, they can in principle be excited and driven to finite absolute amplitude using a relatively minor amplitude of fuel flow pulsation modulation. This also allows optimization via feedback looping of fuel flow modulation timing from combustor dynamic response. Second, they result in substantial net bulk flow oscillation within the combustor volume, at negligible net penalty in system pressure drop. This is central to the use of this overall driven oscillatory flow process as a mechanism for $NO_x$ emission control. In that context, the major net driver is the cyclic expansion and contraction of the primary/secondary combustion zone. As discussed above, this is triggered by fuel flow pulsation, and enhanced in absolute amplitude by a combination of air input jet and internal combustor response modes. In terms of internal combustor flow, the result can be, for example, a bulk longitudinal flow oscillation, typically with a cycle period in the range 1 to 10 milliseconds. This bulk flow oscillation in turn drives an enhanced rate of gas phase mixing, which has the desired effect of decreasing the total quantity of $NO_x$ formation. It also enhances the mixing rate and homogeneity in the beterogenous spray combustion environment of the primary zone, decreasing the net extent of $NO_x$ formation associated with local fuel-lean volumes therein.

The critical regime of gas phase mixing corresponds to the transition of combustion product gases from slightly fuel rich to highly fuel lean, as shown in FIG. 2. The intermediate regime allows $NO_x$ formation at high rate, controlled by chemical kinetic steps, in the vicinity of 1000 ppm/msec. This high basic kinetic rate allows a very rapid approach to chemical equilibrium $NO_x$ concentration, far in excess of the environmentally allowable level. The critical gas phase mixing step proceeds typically via turbulent dissipation, leading to local mixing. The details of this are of direct importance to effective control of $NO_x$ formation, since they control the amount of time spent under conditions allowing a high rate of $NO_x$ formation. Minimization of that time results directly in minimization of total exhaust $NO_x$ concentration.

The effect of the bulk flow oscillation discussed above on gas phase mixing is to differentially accelerate the combusting gases, depending upon their local densities, to provide enhanced contact and interface stretching among local gas volumes of different densities. Since the density is directly and quantitatively related to the local gas stoichiometry, the net effect is to enhance mixing among local gas volumes of different stoichiometry, leading to a rapid homogenization of gas stoichiometry to a level resulting in low net $NO_x$ formation rate. The critical mixing step occurs at the interface region between fuel-rich and fuel-lean gas volumes, or between local volumes of gas having intermediate stoichiometry (e.g., in the range 0.6 to 1.2) and adjacent gas volumes of higher or lower stoichiometry. Due to its stoichiometry, this combustion gas is at relatively high temperature, and hence of relatively low density, and is thus differentiated in its inertial response to bulk flow oscillation from relatively fuel-rich or lean gases in proximity to it. This can substantially enhance the rate of mixing in this critical high $NO_x$ formation rate regime. All of the fuel rich combustion products necessarily transition through this regime while engaged in a continuous mixing transition to a fuel-lean condition. Minimization of the time spent in this transition regime, by density-dependent differential acceleration, results in minimal net $NO_x$ production.

The high mixing rate is thus achieved via a bulk gas oscillation, achieved at low penalty in thermodynamic efficiency by externally modulating the fuel delivery rate in a prescribed and controlled manner. Achievement of comparable enhanced mixing and corresponding $NO_x$ control by use of steady state air jet mixing is typically prohibitively expensive in terms of resulting engine efficiency penalties and combustor hardware complexity.

Figure 7:
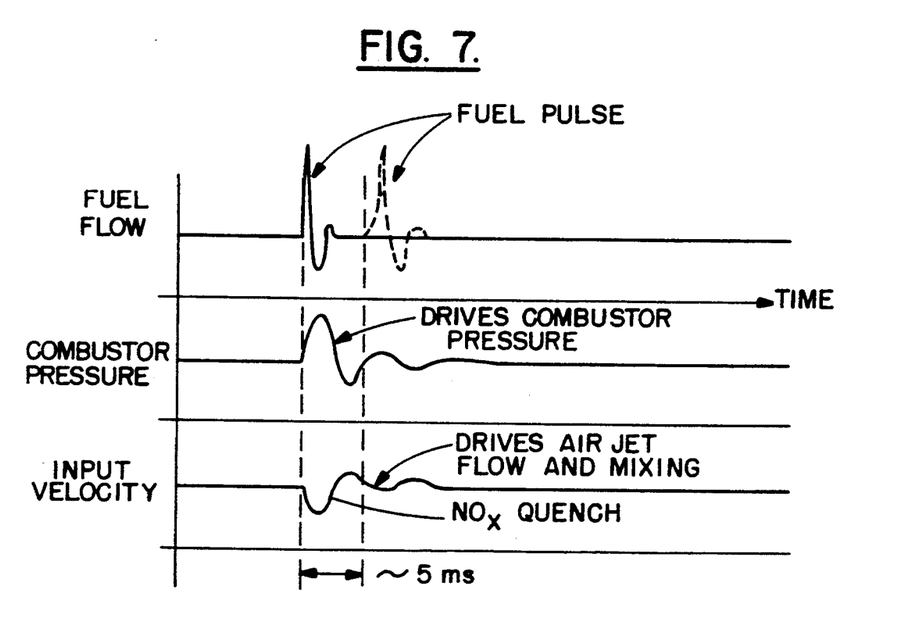
FIG. 7 is a chart illustrating the correlation between pulsed fuel flow with a temporal variation in fuel supply rate, combustor pressure and air input velocity for a fuel pulse driving a combustor with a flow resonance time of about 5 milliseconds

FIG. 7 of the drawings illustrates the correlation between a single fuel flow pulse perturbation to the steady fuel flow rate as a transient in fuel spray delivery to the combustor, and the combustor pressure and air input velocity during and immediately following such a fuel pulse. The modulated fuel flow transient causes an increase or decrease transient in combustor pressure and a decrease or increase transient in air input velocity depending on whether the primary combustion region into which it is introduced is operating with excess air or excess fuel, relative to unity equivalence ratio. In the event that this combustion region is operating at an equivalence ratio close to unity, the resulting pressure transient and corresponding air input velocity transient will be relatively small in amplitude. Generation of a combustor pressure and flow transient also requires that the duration of the fuel pulse event is shorter than or similar to the dynamic flow and pressure response time of the combustor. The result of such a fuel modulation is a controlled degree of combustion oscillation which produces uniform or homogeneous mixing of the fuel and the air and decreased $NO_x$ formation.

This enhanced and controlled mixing decays rapidly in time following a fuel pulse, as the combustor pressure and air input velocity decay to their steady state levels. A second fuel flow pulse shown by means of broken lines in FIG. 7 would force a repeat of the combustor pressure and flow cycle. Efficient implementation of this means of combustion pollution control requires timing such subsequent fuel flow modulations to occur at an appropriate time in the combustor pressure perturbation cycle. FIG. 6 shows a condition for which each fuel flow pulse is optimally delivered as the instantaneous combustor pressure crosses the steady state value, with the pressure increasing with time. Such fuel flow pulse timing or modulation results in cyclic driving of the combustor pressure and flow oscillation, resulting in a minimum fuel flow pulsation requirement to provide effective control of $NO_x$ pollutant formation. The effect of such fuel flow pulsing is a radically enhanced mixing rate and fuel/air homogeneity throughout the comustot and a significant reduction in $NO_x$ formation.

In the case of a pulsed fuel flow transient such as shown in FIG. 7, the duration of a fuel pulse flow transient is preferably small relative to the inherent combustor-air flow oscillation time scale. This results in relatively efficient forcing of the combustor pressure and flow oscillation and corresponding decrease in net $NO_x$ production through enhanced internal gas mixing rate. The on-duration of each fuel flow pulse perturbation cycle is typically less than the off-duration and is generally less than about 20% of the total cycle duration. Commonly the cycle duration is about 3 ms and the fuel duration comprises from about 0.1 to 0.5 ms of said cycle.

The precise intervals of the fuel flow perturbation pulse cycles and the durations of the fuel-on and fuel-off periods of said cycles can be determined and approximately pre-set under test conditions which monitor the actual $NO_x$ emissions. Preferably, one would also monitor the internal combustor pressure variation and/or the optical luminosity variation of the spray combustion region to coordinate the duration of the fuel pressure pulses and the timing between fuel pressure pulses with monitored conditions representative of minimum $NO_x$ emissions.

Figure 8:
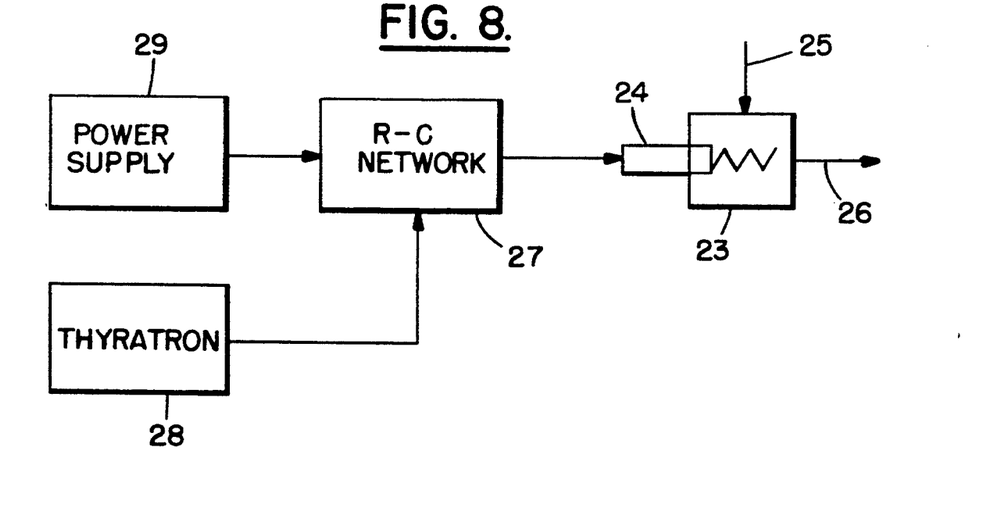
FIG. 8 is a diagram illustrating a means for producing pulsed fuel delivery according to one embodiment of the present invention.

More preferably, the present system is provided with automated fuel pulse control means, as discussed hereinbefore and illustrated by FIGS. 5 and 8 of the drawings, for continuously sensing the operation of the combustor and automatically regulating the modulation of the fuel pulse on-and off-durations to produce minimum $NO_x$ emissions under the various normal conditions of operation of the engine.

FIG. 8 illustrates an electrical fuel pulsing system useful according to an embodiment of the present invention, comprising a spark discharge pulsing chamber 23 incorporating an electrical discharge electrode 24, a fuel supply line 25 and a pulsed flow discharge line 26 exiting at the atomizer nozzle to the combustor. Intermittent activation of the electrode 24 heats, vaporizes and expands a small fraction of the fuel in the chamber 23 to a pressure which causes it to drive a fuel flow discharge into the line 26 as a pulsed flow. The duration of these fuel pulses, and the duration between such pulses, is controlled by a resistor-capacitor network means 27 triggered by a thyratron 28 and energized by a power supply 29.

The thyratron 28 may be associated with combustor sensor feedback for the automatic regulation of the resistor capacitor network 27 to control and regulate the duration of the power supply period to the electrode 24, e.g., about 10 microseconds, and the duration between power supply periods, e.g., about 3 ms. The actual duration of the fuel flow pulse transient is determined in part by the acceleration response of the liquid fuel to the pressure force caused by the gas bubble formed by the electrical discharge from electrode 24 to the electrical ground of chamber 23, or a second electrode introduced as the electrical ground path, and in part by the cooling and corresponding collapse of said gas bubble, and may typically be about 100 microseconds.

Figure 9:
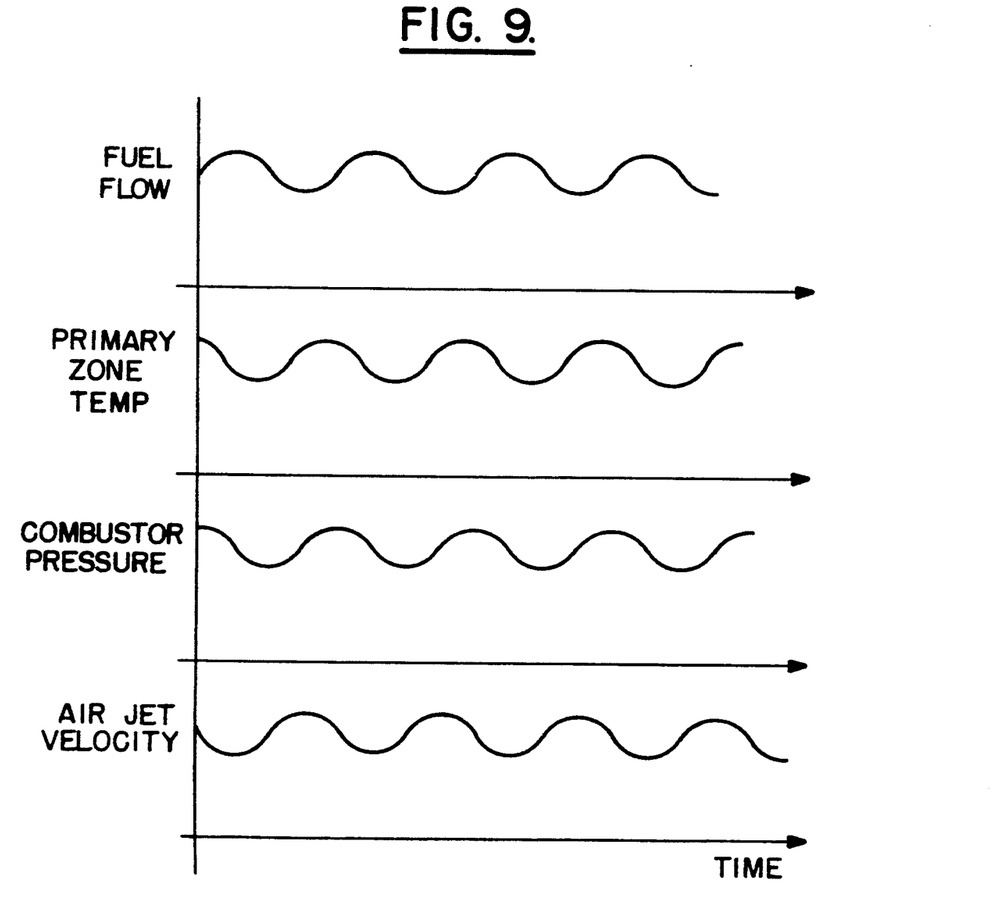
FIG. 9 is a chart illustrating the correlation between oscillatory fuel flow, combustion zone temperature, pressure and air jet velocity.

Alternatively, a fuel flow variation extending over the full time duration of the inherent combustor pressure oscillation period, as shown in FIG. 9, can be employed to drive combustor pressure and flow oscillations and to provide a decreased net level of $NO_x$ pollutant formation. Such fuel flow time variation could be in the approximate form of a sinusoid or such other waveform as is produced by a fuel flow modulation system. The time lags associated with air flow inertia and other such factors are ideally chosen to result in air jet flow velocity approximately out of phase with the fuel flow, so that higher instantaneous fuel flow rate has corresponding lower instantaneous air flow rate, amplifying the effect of the fuel flow perturbation on the primary zone stoichiometry, its temperature, and consequently on the combustor pressure and flow oscillation, and hence resulting in a maximum degree of internal combustor flow mixing and $NO_x$ control for a minimum level of fuel flow perturbation.

It will be apparent to those skilled in the art of metering liquids at modulated flow rates, in the light of the present disclosure, that various specific electrical, mechanical or other means may be used for activating and regulating the fuel modulation cycles of the present invention provided that they are capable of precise operation within the narrow and brief time cycles required, e.g., fuel pulse durations of about 0.1 to 1.0 ms spaced by inter-pulse durations of about 1.0 to 9.0 ms.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. In a gas turbine combustion process in which liquid fuel is introduced to a primary combustion zone of a combustor as a fine spray and air is compressed and introduced as primary air to primary combustion zone with the fuel spray to form a combustile mixture, and is also introduced as secondary air to a secondary combustion zone through a multiplicity of discrete jets and cooling passageways to cool the combustor walls, assist the mixing of the fuel and air, complete the combustion of the gases from the primary combustion zone and cool and dilute them for emission, the improvement which comprises supplying a continuous flow of said liquid fuel and primary air to form a combustile mixture in said primary combustion zone, modulating the flow rate of a portion of said liquid fuel to introduce uniformly-spaced modulations in the fuel flow rate, with a time period between peaks in said uniformly-spaced modulations of less than about 10 milliseconds, in order to produce a controlled variation of primary zone combustion temperature and volume, resulting in a controlled degree of gas flow oscillation in the form of cyclic expansion and contraction of the primary and secondary combustion zones without creating a net pressure gain throughout the combustion chamber, thereby substantially improving the gas phase mixing rate and the homogeneity of the formed fuel/air mixtures and decreasing the net extent of $NO_x$ formation normally resulting from the transitioning of fuel-air mixtures from high to low stoichiometry during combustion or oxidation.

2. The process according to claim 1 in which said modulations comprise repeated transient increases or decreases in the fuel supply relative to the normal continuous rate of fuel supply.

3. The process according to claim 1 in which said modulations comprise a temporal variation of the fuel supply relative to the time-averaged steady fuel flow rate.

4. The process according to claim 1 in which said modulations have a peak duration of less than about 1 millisecond and a between-peak duration of from about 0.1 millisecond to less than about 10 milliseconds.

5. The process according to claim 1 in which the modulated portion of the fuel supply is at least about 10% by volume of the total fuel supply.

6. The process according to claim I which comprises modulating said flow rate through one or more controllable flow pulsing means.

7. The process according to claim 6 which comprises modulating the flow rate through a plurality of fuel pulsing means which are time-phased with one another.

8. The process according to claim 1 which comprises sensing a condition of the combustion process representative of the extent of $NO_x$ formation, and adjusting the frequency and/or amplitude of the modulations in order to maintain said condition at a level representative of low $NO_x$ formation.

9. The process according to claim 8 in which said condition is the amplitude of combustor pressure oscillation.

10. The process according to claim 8 in which said condition is the combustor-air plenum pressure differential.

11. The process according to claim 8 in which said condition is the magnitude of the light emission oscillation of the combustion reaction.

12. The process according to claim 8 in which said condition is the $NO_x$ content of the combustion product gases from the combustor.

13. The process according to claim 1 which comprises introducing said fine spray through a plurality of fuel injectors which are controlled by fuel pulsing means.

14. The process according to claim 13 which comprises introducing said fine spray through a plurality of fuel injectors which are controlled by fuel pulsing means, the operation of said fuel pulsing means being time-phased relative to each other.

15. In a gas turbine combustion process in which liquid fuel is introduced through a plurality of fuel injectors to a primary combustion zone of a combustor as a fine spray, and air is compressed and introduced as primary air to the primary combustion zone with the fuel spray to form a combustible mixture, and is also introduced as secondary air to a secondary combustion zone through a multiplicity of discrete jets and cooling passageways to cool the combustor walls, assist the mixing of the fuel and air, complete the combustion of the gases from the primary combustion zone and cool and dilute them for emission, the improvement which comprises supplying a continuous flow of said liquid fuel and primary air to form a combustible mixture in said primary combustion zone, modulating the flow rate of a portion of said liquid fuel through each of said fuel injectors in the form of uniformly-spaced modulations in the fuel flow rate, sensing a condition of the combustion process representative of the extent of $NO_x$ formation, and adjusting the frequency and/or amplitude of the modulations in order to produce a controlled degree of gas flow oscillation in the form of cyclic expansion and contraction of the primary and secondary combustion zones without creating a net pressure gain throughout the combustion chamber, thereby substantially improving the gas phase mixing rate and the homogeneity of the formed fuel/air mixtures and decreasing the net extent of $NO_x$ formation normally resulting from the transitioning of fuel-air mixtures from high to low stoichiometry during combustion or oxidation.

16. The process according to claim 15 which comprises adjusting the amplitude of said modulations as repeated transient increases or decreases in the fuel supply relative to the normal continuous rate of fuel supply.

17. The process according to claim 15 which comprises adjusting the temporal variation of the fuel supply modulations relative to the time-averaged steady fuel flow rate.

18. The process according to claim 15 which comprises adjusting the frequency of said modulations to have an on-duration of less than about 1 millisecond spaced by off-durations of less than about 10 milliseconds.

19. The process according to claim 15 in which the modulated portion of the fuel supply is at least about 10% by volume of the total fuel supply.

20. The process according to claim 15 which comprises modulating said flow rate through one or more controllable fuel pulsing means.

21. The process according to claim 20 which comprises time-phasing the operation of each of said fuel pulsing means relative to each other.

22. The process according to claim 15 in which said condition is the amplitude of combustor pressure oscillation.

23. The process according to claim 15 in which said condition is the combustor-air plenum pressure differential.

24. The process according to claim 15 in which said condition is the magnitude of the light emission oscillation of the combustion reaction.

25. The process according to claim 15 in which said condition is the $NO_x$ content of the emission.

26. In a gas turbine combustor apparatus comprising means for introducing liquid fuel to a primary combustion zone as a fine spray and means for compressing the introducing primary air to primary combustion zone with the fuel spray to form a combustile mixture, and means for introducing secondary air to a secondary combustion zone through a multiplicity of discrete jets and cooling passageways to cool the combustor walls, assist the mixing of the fuel and air, complete the combustion of the gases from the primary combustion zone and cool and dilute them for emission, the improvement which comprises means for modulating the flow rate of a portion of said liquid fuel in the form of uniformly-spaced increases in the fuel flow rate, with a time period between peaks in said uniformly-spaced modulations of less than about 10 milliseconds, in order to produce a controlled variation of primary zone combustion temperature and volume, resulting in a controlled degree of gas flow oscillation in the form of cyclic expansion and contraction of the primary and secondary combustion zones without creating a net pressure gain throughout the combustion chamber, thereby substantially improving the gas phase mixing rate and the homogeneity of the formed fuel/air mixtures and decreasing the net extent of $NO_x$ formation normally resulting from the transitioning of fuel-air mixtures from high to low stoichiometry during combustion or oxidation.

27. Apparatus according to claim 26 in which said means for modulating the flow rate comprises means for inducing repeated transient increases or decreases in the fuel supply relative to the normal continuous rate of fuel supply.

28. Apparatus according to claim 26 in which said means for modulating the flow rate comprises means for inducing a temporal variation of the fuel supply relative to the time-averaged steady fuel flow rate.

29. Apparatus according to claim 26 in which said means for modulating the flow rate comprises means for inducing pulses of increased or decreased fuel flow having a duration of less than about 1 millisecond.

30. Apparatus according to claim 26 which comprises means for modulating at least about 10% by volume of the total fuel supply.

31. Apparatus according to claim 26 which comprises one or more controllable flow pulsing means for modulating said rate flow, 32. Apparatus according to claim 31 which comprises a plurality of fuel pulsing means which are time-phased relative to one another.

33. Apparatus according to claim 26 which comprises means for sensing a condition of the combustion process representative of the extent of $NO_x$ formation, and means for adjusting the frequency and/or amplitude of the modulations in order to maintain said condition at a level representative of low $NO_x$ formation.

34. Apparatus according to claim 33 which comprises means -for sensing the amplitude of combustor pressure oscillation.

35. Apparatus according to claim 33 which comprises means for sensing the combustor-air plenum pressure differential.

36. Apparatus according to claim 33 which comprises means for sensing the magnitude of the light emission oscillation of the combustion reaction.

37. Apparatus according to claim 33 which comprises means for sensing the $NO_x$ content of the emission.

38. Apparatus according to claim 26 which comprises a plurality of fuel injectors which are controlled by fuel pulsing means, for introducing said fine spray of liquid fuel.

39. Apparatus according to claim 38 which comprises means for time-phasing the operation of each of said fuel pulsing means relative to each other.

40. In a gas turbine combustor apparatus comprising a plurality of fuel injectors for introducing liquid fuel to a primary combustion zone as a fine spray and means for compressing and introducing primary air to the primary combustion zone with the fuel spray to form a combustible mixture, and means for introducing secondary air to a secondary combustion zone through a multiplicity of discrete jets and through cooling passageways to cool the combustor walls, assist the mixing of the fuel and air, complete the combustion of the gases from the primary combustion zone and cool and dilute them for emission, the improvement which comprises means for modulating the flow rate of a portion of said liquid fuel in the form of uniformly-spaced increases in the fuel supply rate, means for sensing a condition of the combustion process representative of- the extent of $NO_x$ formation, and means for adjusting the frequency and-/or amplitude of the modulations, in order to produce a controlled variation of primary zone combustion temperature and volume, resulting in a controlled degree of gas flow oscillation in the form a cyclic expansion and contraction of the primary and secondary combustion zones without creating a net pressure gain throughout the combustion chamber, thereby substantially improving the gas phase mixing rate and the homogeneity of the formed fuel/air mixtures and decreasing the net extent of $NO_x$ formation normally resulting from the transitioning of fuel-air mixtures from high to low stoichiometry during combustion or oxidation.

* * * * *

UNITED STATES PATENT AND TRADEMARK OFFICE
CERTIFICATE OF CORRECTION

PATENT NO. : 5,349,811
DATED : September 27, 1994
INVENTOR(S) : Strickler et al.

It is certified that error appears in the above-identified patent and that said Letters Patent is hereby corrected as shown below:

IN THE CLAIMS:

Claim 26, col. 15, line 38 delete "the" and insert --and--.

Claim 31, col. 16, line 12 delete "," and insert --.--.

Claim 40, col. 16, line 54 after "of" delete "-".

Signed and Sealed this

Fifteenth Day of November, 1994

Attest:

BRUCE LEHMAN

Attesting Officer

Commissioner of Patents and Trademarks